United States Patent
Song et al.

(10) Patent No.: US 9,570,241 B2
(45) Date of Patent: Feb. 14, 2017

(54) DYE-SENSITIZED SOLAR CELL MODULE USING THIN GLASS SUBSTRATE AND METHOD OF MANUFACTURING THE SAME

(71) Applicant: Hyundai Motor Company, Seoul (KR)

(72) Inventors: Mi Yeon Song, Seoul (KR); Won Jung Kim, Seoul (KR); Ki Chun Lee, Seoul (KR); Sang Hak Kim, Seoul (KR); Ji Yong Lee, Seoul (KR); Yong Jun Jang, Gyeonggi-do (KR); Yong-gu Kim, Gyeonggi-Do (KR); In Woo Song, Gyeonggi-Do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/992,162

(22) Filed: Jan. 11, 2016

(65) Prior Publication Data

US 2016/0126018 A1  May 5, 2016

Related U.S. Application Data

(62) Division of application No. 13/397,050, filed on Feb. 15, 2012, now Pat. No. 9,251,962.

(30) Foreign Application Priority Data

Nov. 30, 2011  (KR) .......................... 10-2011-0126566

(51) Int. Cl.
  *H01L 31/00*  (2006.01)
  *H01G 9/20*  (2006.01)
(52) U.S. Cl.
  CPC .............. *H01G 9/2022* (2013.01); *H01G 9/20* (2013.01); *H01G 9/2059* (2013.01); *Y02E 10/542* (2013.01)

(58) Field of Classification Search
  CPC ..... Y02E 10/542; Y02E 10/50; H01G 9/2031; H01G 9/2059
  See application file for complete search history.

(56) References Cited

U.S. PATENT DOCUMENTS

2006/0174938 A1  8/2006  Di Palma et al.
2011/0011456 A1*  1/2011  Han ..................... H01G 9/2031
                                                            136/258
(Continued)

FOREIGN PATENT DOCUMENTS

CN  101503277 A  8/2009
CN  101904045 A  12/2010
(Continued)

*Primary Examiner* — Whitney T Moore
*Assistant Examiner* — Joseph Galvin, III
(74) *Attorney, Agent, or Firm* — Mintz Levin Cohn Ferris Glovsky and Popeo, P.C.; Peter F. Corless

(57) ABSTRACT

Disclosed are a dye-sensitized solar cell module and a method of manufacturing the same. The dye-sensitized solar cell module includes a working electrode formed by stacking a collector and a photo-electrode to which a dye is adsorbed on a transparent conductive substrate; a counter electrode formed by stacking a collector and a catalytic electrode on a transparent conductive substrate; and an electrolyte filled in a space between the working electrode and the counter electrode sealed by a sealant. A glass substrate for the working electrode of glass substrates forming the transparent conductive substrates for the electrodes is a thin glass plate substrate thinner than the glass substrate for the working electrode.

2 Claims, 3 Drawing Sheets

(56) References Cited

U.S. PATENT DOCUMENTS

2011/0126879 A1* 6/2011 Kitamura ............. H01G 9/2081
136/244
2011/0174352 A1* 7/2011 Yang .................... H01G 9/2077
136/244
2013/0133733 A1* 5/2013 Song .................... H01G 9/2059
136/256

FOREIGN PATENT DOCUMENTS

| CN | 102106032 A | 6/2011 |
|---|---|---|
| CN | 102163504 A | 8/2011 |
| JP | 2005149814 A | 6/2005 |
| KR | 10-0786334 B1 | 12/2007 |
| KR | 10-1044338 B1 | 6/2011 |

* cited by examiner

DYE-SENSITIZED SOLAR CELL MODULE USING THIN GLASS SUBSTRATE AND METHOD OF MANUFACTURING THE SAME

CROSS-REFERENCE TO RELATED APPLICATION

This application is a divisional of U.S. application Ser. No. 13/397,050, filed Feb. 15, 2012, which claims under 35 U.S.C. §119(a) the benefit of Korean Patent Application No. 10-2011-0126566 filed on Nov. 30, 2011, the entire contents of which are incorporated herein by reference.

BACKGROUND (a) Technical Field

The present invention relates to a dye-sensitized solar cell module and a method of manufacturing the same. More particularly, it relates to a large-area dye-sensitized solar cell module which can reduce the weight of the cell without degrading performance by reducing the thickness thereof using a thin glass plate substrate, and a method of manufacturing the same.

(b) Background Art

In recent years, as global warming is becoming a serious problem, technologies for utilizing environmentally friendly energies have begun to emerge as a necessity in the future growth of energy sources. In particular, solar cells have been significantly beneficial because they utilize renewable energy. These solar cells include silicon solar cells, thin film solar cells using inorganic materials such as copper indium gallium selenide (CIGS)(Cu(InGa)Se$_2$) and cadmium telluride (CdTe), dye-sensitized solar cells, organic solar cells, and organic-inorganic hybrid solar cell.

Among the solar cells, silicon solar cells have already been widely used commercially in various fields such as houses and industrial plants, but their price and installation costs are prohibitively expensive for smaller applications. However, dye-sensitized solar cells are inexpensive compared to silicon solar cells and can achieve semi-transparent designs or other various designs. Therefore, many studies on the dye-sensitized solar cells are being made.

More specifically, dye-sensitized solar cells may be applied not only to houses but also to building integrated photovoltaic power generation systems like silicon solar cells, and may be applied to various fields including electronic industrial fields such as home appliances and portable electronic devices, and roofs and glass windows for vehicles. Such a dye-sensitized solar cell includes a system for generating electricity by using a photoelectric conversion mechanism configured to absorb visible light from a Ru-based pigment adsorbed to a TiO$_2$ and form a photocurrent.

FIG. 1 is a sectional view illustrating a conventional dye-sensitized solar cell module. As illustrated in FIG. 1, the dye-sensitized solar cell module 1 includes a working electrode 10 on which a photo-electrode 13, to a which a dye is adsorbed, is stacked, a counter electrode 20 on which a catalytic electrode 23 is stacked, and an electrolyte 30 filled within a sealed space between the working electrode 10 and the counter electrode 20.

The example of the dye-sensitized solar cell module 1 includes a dye-sensitized solar cell module 1 where a photo-electrode 13 (or a semiconductor oxide thick film) such as TiO$_2$, to which a Ru-based dye capable of absorbing light, is stacked on a transparent conductive substrate 11a of a working electrode 10. A catalytic electrode 23 using platinum Pt is stacked on a transparent conductive substrate 21a of a counter electrode 20, and an I$^-$/I$_3^-$-based electrolyte 30 is filled in a space between the working electrode 10 and the counter electrode 20 sealed by a sealant 31 with the working electrode 10 and the counter electrode 20 which are bonded to each other.

A collector may be formed in an interior of the dye-sensitized solar cell module to acquire necessary electric power by applying the dye-sensitized solar cell module to applications, making it possible to effectively collect a photocurrent. Then, an overall efficiency of a dye-sensitized solar cell is influenced by the size of a collector and a photo-electrode in a working electrode when modules are manufactured through the same process. Accordingly, many studies on structures of dye-sensitized solar cell modules including components, shapes, and dispositions of collectors have been conducted to provide the most efficient cells. In particular, a collector capable of collecting a photocurrent may be used in order to apply a dye-sensitized solar cell to an application over a large area.

In FIG. 1, the reference numeral 11 denotes a substrate of the working electrode 10, the reference numeral 12 denotes a transparent electrode material layer (FTO, Fluorine Doped Tin Oxide (SnO$_2$:F)) formed on the substrate 11, the reference numeral 21 denotes a substrate of the counter electrode 20, and the reference numeral 22 denotes a transparent electrode material layer formed on the substrate 21. Furthermore, the reference numeral 25 denotes a portion of the collector 24a exposed to the outside of the module 1, i.e. a collector bottom portion 25 of the counter electrode 20.

FIG. 2 is a view illustrating an example of forming a collector 14a in the working electrode 10. The collector 14a includes collector cells 14 surrounded by a protective film 16, and a collector bottom portion 15 to which the collector cells 14 are connected. More specifically, as illustrated in FIG. 2, in a general dye-sensitized solar cell module having the collector 14a, the silver collector cells 14 surrounded by the protective films 16 interposed between the collector cells 14 and the TiO$_2$ photo-electrode 13 are formed in a line on the transparent conductive substrate 11a. Then, the collector cells 14 extend to the collector bottom portion 15 stacked along a periphery of the transparent conductive substrate 11a to be integrally connected to each other.

Likewise, although not illustrated in the drawings, thin collector cells surrounded by a protective film interposed between the collector cells and the catalytic electrode 23 are formed in the counter electrode 20. The collector cells extend to the collector bottom portion 25 (see FIG. 1) stacked along a periphery of the counter electrode 20 to be integrally connected to each other.

As illustrated in FIG. 1, the collector bottom portions 15 and 25 are exposed to the outside of the module 10 in the electrodes 10 and 20, and act as electrode portions electrically connecting adjacent modules when a solar cell module is constructed by using a plurality of solar cell modules 1.

The transparent conductive substrates 11a and 21a used for the working electrode 10 and the counter electrode 20 are manufactured by stacking a transparent electrode material, e.g., FTO on glass substrates 11 and 21 consisting of soda-lime glass, in which case the thickness of the glass substrates 11 and 21 is about 2 to 3 mm.

However, since the weight of the dye-sensitized solar cell module 1 tends to increase as the side thereof becomes larger, there is a need to reduce the weight of the module when the module is applied to application products such as a roof (e.g., a sunroof and a panorama roof) of a vehicle, a sun visor for a vehicular glass window, and other electronic products.

Although a dye-sensitized solar cell may be manufactured by using a flexible substrate in order to solve this problem, a performance of a dye-sensitized solar cell using a flexible substrate is degraded in comparison with a dye-sensitized solar cell which uses a conventional glass substrate.

Korean Patent Application Publication No. 2009-0067416 discloses a technology for applying a solar cell film using a flexible substrate to a vehicle in which a solar cell film is inserted into a glass window. However, although this flexible substrate is lighter than a glass substrate, and it is impossible to heat-treat the flexible substrate in an aspect of processing, a solar cell using a flexible substrate has performance characteristics which are much lower than that of a solar cell using a glass substrate and the utility of the solar cell using a flexible substrate is thus degraded.

SUMMARY OF THE DISCLOSURE

The present invention provides a large area dye-sensitized solar cell module which includes a working electrode to which a photo-electrode is applied, a counter electrode to which a catalytic electrode is applied, and an electrolyte filled in a sealed space between the working electrode and the counter electrode and a method of manufacturing the same. More specifically, the dye-sensitized solar cell's thickness can be reduced without degradation of performance.

In one aspect, the present invention provides a method of manufacturing a dye-sensitized solar cell module. In particular, the method includes stacking a transparent conductive material layer on a glass substrate to manufacture a transparent conductive substrate for a working electrode; stacking a transparent electrode material layer on a thin glass plate substrate thinner than the glass substrate of the transparent conductive substrate for the working electrode to manufacture a transparent conductive substrate for a counter electrode; stacking a collector and a photo-electrode on the transparent conductive substrate for the working electrode to finish the working electrode; stacking a collector and a catalytic electrode on the transparent conductive substrate for the counter electrode to finish the counter electrode; and bonding the working electrode and the counter electrode with a sealant, injecting an electrolyte through an electrolyte injection aperture into a space between the working electrode and the counter electrode sealed with the sealant, and sealing the electrolyte injection aperture, to finish the solar cell module.

In another aspect, the present invention provides a dye-sensitized solar cell module which includes a working electrode formed with a collector and a photo-electrode to which a dye is adsorbed stacked on a first transparent conductive substrate; a counter electrode formed with a collector and a catalytic electrode stacked on a second transparent conductive substrate; and an electrolyte filled in a space between the working electrode and the counter electrode sealed by a sealant. In particular, a glass substrate in the counter electrode of glass substrates forming the transparent conductive substrates for the electrodes is a thin glass plate substrate thinner than the glass substrate for the working electrode.

Therefore, according to a dye-sensitized solar cell module and a method of manufacturing the same of the present invention, since a thin glass plate substrate having a thickness thinner than a glass substrate used for a substrate material of a working electrode is used for a substrate material of a counter electrode and a process for manufacturing the counter electrode is improved, the counter electrode and the solar cell module can be made thin without the thin glass plate substrate being warped while weight reduction without degradation of performance.

Consequently, the dye-sensitized solar cell module of the present invention which is lighter than conventional dye-sensitized solar cells while at the same time securing strength without degrading performance. Thus, the dye-sensitized solar cell module of the illustrative embodiment of the present invention can be usefully applied to parts of a vehicle such as a roof or a sun visor. In this case, since the vehicle can be made lighter, fuel efficiency can also be improved.

BRIEF DESCRIPTION OF THE DRAWINGS

The above and other features of the present invention will now be described in detail with reference to certain exemplary embodiments thereof illustrated in the accompanying drawings which are given herein below by way of illustration only, and thus are not limitative of the present invention, and wherein.

DETAILED DESCRIPTION

Hereinafter, exemplary embodiments of the present invention will be described in detail with reference to the accompanying drawings so that those skilled in the art to which the invention pertains can easily carry out the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The present invention relates to a large area dye-sensitized solar cell module including a working electrode to which a photo-electrode is applied, a counter electrode to which a catalytic electrode is applied, and an electrolyte filled in a sealed space between the working electrode and the counter electrode, whereby the thickness of the module can be reduced, making it possible to lighten the module without degrading performance, and a method of manufacturing the same.

Figure 1:
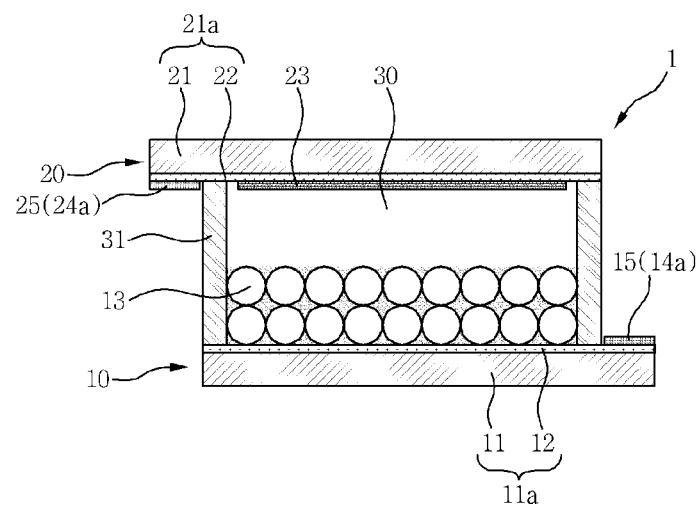
FIG. 1 is a sectional view illustrating a conventional dye-sensitized solar cell module.
Figure 2:
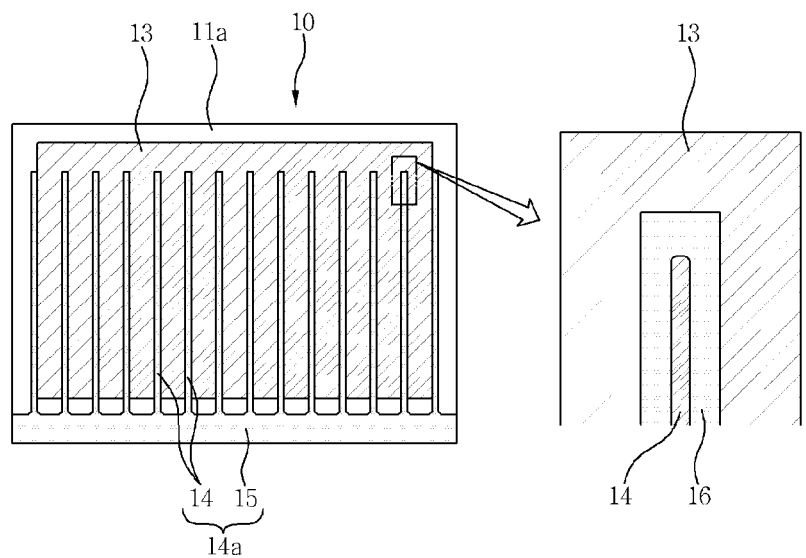
FIG. 2 is a view schematically illustrating a structure of a working electrode having a collector in the conventional dye-sensitized solar cell module.
Figure 3:
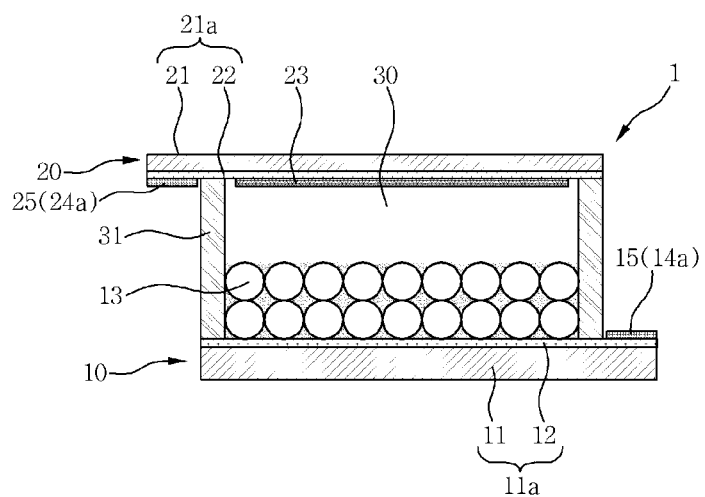
FIG. 3 is a sectional view illustrating a dye-sensitized solar cell module according to an exemplary embodiment of the present invention.

FIG. 3 is a sectional view illustrating a dye-sensitized solar cell module according to an exemplary embodiment of the present invention. As illustrated in FIG. 3, the solar cell module 1 of the present invention uses glass substrates 11 and 21 as materials of substrates forming the working electrode 10 and the counter electrode 20 instead of using flexible substrates which degrade the performance, in which case a thin glass plate is used for a substrate material of the counter electrode 20, lightening the module while decreasing the thickness of the module.

That is, when the working electrode 10 and the counter electrode 20 are manufactured, transparent conductive substrates 11a and 21a are first manufactured by stacking transparent electrode material layers 12 and 22 consisting of Fluorine doped Tin oxide (FTO) on glass substrates 11 and 21, in which case the glass substrate 21 used for the counter electrode 20 is thinner than the glass substrate 11 used for the working electrode 10. Since when the two glass substrates 11 and 21 are used to manufacture the module 1, a heat treatment process is required, a module with an excellent performance can be manufactured as compared with a module which uses a flexible substrate.

However, when both the working electrode 10 and the counter electrode 20 are manufactured with thin glass plates, the module may be easily broken. In particular, when a conventional process is applied as it is, the photo-electrode 13 and the glass frit for forming a protective film may be warped in the process of heat-treating collectors 14a and 24a at a high temperature.

According to the present invention, considering the above-mentioned problem, the working electrode 10 to which the photo-electrode 13 influencing efficiency is applied employs a glass substrate 11 with a thickness of 1.5 to 3 mm which the same as the conventional one so that the conventional process can be applied as it is, and the counter electrode 20 manufactured with a relatively simple process employs a thin glass plate substrate 21 with a thickness of 0.1 to 1 mm as a material of the substrate and the process for the counter electrode 20 is improved, securing a safety and a lightness of the module.

Here, when a thin glass film with a thickness of 0.1 mm is used as a substrate material for the counter electrode 20, it may be easily broken during a manufacturing process or treatment thereof. Moreover, it may not be applied to a vehicle in the form of a sunroof, a panorama roof, or a sun visor for a glass window in an aspect of strength of the solar cell module 1, which is not desirable. Furthermore, when a glass substrate has a thickness exceeding 1 mm, it is not sufficient to satisfy an aspect of lightness to be achieved by the present invention, which is not desirable.

FIG. 3 illustrates a sectional structure of a light dye-sensitized solar cell module 1 according to the illustrative embodiment of the present invention. As illustrated in FIG. 3, the dye-sensitized solar cell module 1 includes a working electrode 10 on which a photo-electrode 13 formed of Titanium dioxide ($TiO_2$) to which a dye (for example, a known Ru-based dye) is adsorbed is stacked, a counter electrode 20 on which a catalytic electrode 23 containing platinum (Pt) is stacked, and an electrolyte 30 filled in a space between the working electrode 10 and the counter electrode 20 sealed by a sealant 31. A thin glass plate substrate 21 thinner than a substrate of the working electrode 10 is used for the counter electrode 20.

In this construction, since the working electrode 10 on which the photo-electrode 13 of $TiO_2$ significantly influences a performance of the solar cell, a transparent conductive substrate 11a may be manufactured by stacking a transparent electrode material layer 12 such as an FTO layer on a conventional soda-lime glass substrate and the working electrode 10 may be manufactured by stacking a photo-electrode 13 and a collector 13a on the transparent conductive substrate 11a.

Meanwhile, the counter electrode 20, i.e. an opposite electrode employs a thin glass plate substrate 21 thinner than the glass substrate 11 of the working electrode 10, and a transparent conductive substrate 21a is manufactured by stacking a transparent electrode material layer 22 consisting of FTO on the thin glass plate substrate 21 and then the counter electrode 20 is manufactured by stacking the catalytic electrode 23 and the collector 24a on a transparent conductive thin plate substrate 21a.

When a glass substrate 11 with a thickness of 1.5 to 3 mm is used as a substrate material of the working electrode 10 and a thin glass plate substrate 21 with a thickness of 0.1 to 1 mm is used as a substrate material of the counter electrode 20, the weight of a solar cell module 1 can be reduced by more than 35% as compared with working electrodes and counter electrode with glass substrates having the same thicknesses.

However, in using the thin glass plate substrate 21, when a conventional high-temperature process is applied to a process of manufacturing the transparent conductive substrate 21a or forming the catalytic electrode 23 by stacking the transparent electrode material, the thin glass plate substrate 21 may be warped. Thus, a process of not generating a warping phenomenon in the thin glass plate substrate 21 is required. More specifically, when a soda-lime glass substrate, a lead-alkali glass substrate also called a lead glass substrate, or a low-iron glass substrate is used as a thin glass plate substrate with a thickness of 0.1 to 1 mm, a processing temperature for forming a transparent electrode material layer, a collector, and a catalytic electrode should be limited to a range of about 25 to 400 degrees Celsius during a manufacturing process of the counter electrode 20.

When a glass substrate, such as a borosilicate glass substrate or an aluminosilicate glass substrate, which will not warp during a high temperature treatment, is used for the thin glass plate substrate 21 of the counter electrode 20, a conventional high-temperature process may be applied.

First, in manufacturing the transparent conductive substrate 21a of the counter electrode 20, Indium Zinc Oxide (IZO), Indium Tin Oxide (ITO), and Aluminum doped Zinc Oxide (AZO) as well as Fluorine doped Tin Oxide (FTO) may be used for the transparent electrode material, and a process for stacking a transparent electrode material on the thin glass plate substrate 21 may be Spray Pyrolysis Deposition (SPD), sputtering, or Chemical Vapor Deposition (CVD) which can be processed at a temperature lower than 400 degrees Celsius.

When a silver collector 24a (including a collector cell surrounded by a protective film and a collector bottom portion) is formed in the transparent conductive substrate 21a of the counter electrode 20, patterns of the collector cell and the bottom portion 25 are formed through screen printing or ink-jet printing using silver paste containing a known binder and an amount of the binder in the silver paste is limited to 1 to 20 wt % with respect to 100 wt % of paste to plasticize the paste in a process temperature of less than 400 degrees Celsius. Then, the binder may be a lauric acid, and a minimum amount of binder capable of improving an attaching force between low-molecular organic silver particles and a substrate.

A solvent of silver paste (i.e. silver ink) may include polar solvents such as ethylalcohol, methylalcohol, buthylalcohol, ethylene glycol, isopropanol, ethoxybutanol, methoxyethanol, butoxyethanol, alpha-terpineol, N-methyl-2-pyrrolidone, and N-buthyl amine, and non-polar solvents such as xylene, hexane, octane, toluene, tetrahydrofuran, dimethylformamide, chloroform, ethylene glycol monobutyl ether.

In an embodiment of the present invention, silver nitrate (AgNO$_3$) is used for a silver nano particle precursor, n-butylamine is used for a solvent, sodium borohydride, (NaBH$_4$) is used for a reducing agent, and approximately 5% of diethylene glycol is added to disperse silver nano ink. In this way, a silver nano ink solution (the silver paste) which can be processed in a low temperature may be manufactured, and a collector for a low-temperature process may be formed in the counter electrode. Then, the paste may be sintered through heat treatment at 100 to 400 degrees Celsius.

Here, when an amount of a binder is less than 1 wt %, it is difficult to regulate viscosity and maintain an attaching force of a substrate, and when it exceeds 20 wt %, a higher temperature is required for the plasticity of the paste. Accordingly, the amount of the binder is limited to less than 20 wt %.

In addition, a method of forming a collector cell and a pattern of a bottom portion may include low-temperature processes such as sputtering, chemical vapor deposition, and electro-deposition (E.D.). Moreover, in forming a protective layer for forming a collector, the thermally plasticized glass frit is not desirable as a material of a protective film because a process temperature required for plasticization is too high. Thus, a protective film material to which a low-temperature plasticization process can be applied is used, in which case a ultraviolet (UV) hardener hardened by irradiating UV rays at a high temperature or glass frit for low-temperature plasticization or laser plasticized glass frit is used.

Here, the UV hardener is a polymeric material which can be hardened by irradiating UV rays, and may include polyacrylonitrile, polyester acrylonitrile, polyacrylate, polyether acrylate, polymethacrylate, polymethylmethacrylate, polyvinyl alcohol, polybutadiene acrylate, and silicone acrylate.

The protective film is formed to surround the collector cells, in which case after a material for a protective film, i.e. a UV hardener, a low-temperature plasticized glass frit (sintered at 400 degrees Celsius), or laser plasticized glass fit is applied to a corresponding portion through screen printing, it is hardened through UV irradiation or laser irradiation. Finally, in forming the catalytic electrode 23 in the counter electrode 20, a platinum catalytic electrode may be formed by using a platinum precursor solution which does not contain an organic binder.

A platinum precursor solution using isopropanol and dihydrogen hexachloroplatinate(IV) hexahydrate) (H$_2$PtCl$_6$.H$_2$O) is manufactured, and it may be applied on a surface of the transparent conductive substrate 21.

After the platinum precursor solution is applied, it is dried in an oven and is heat-treated at a temperature of less than 400 degrees Celsius in a sintering furnace to be plasticized. The catalytic electrode 23 may be formed by reducing a platinum catalyst using an electro-chemical process, or may be formed without heat treatment through sputtering or chemical vapor deposition.

When the collector cells, the bottom portion 25, and the catalytic electrode 23 are formed by using printing in the process of manufacturing the counter electrode 20, the cells are dried in an oven and finally heat-treated at a temperature of less than 400 degrees Celsius to be plasticized Additionally, the counter electrode 20 may be finished without heat treatment when a process such as sputtering or chemical vapor deposition is applied.

When a dye-sensitized solar cell module is manufactured through a manufacturing method according to the present invention, weight reduction can be achieved without degradation of performance. In particular, the weight is reduced by more than 35% as compared with a conventional module when the counter electrode is replaced by a thin plate electrode. Furthermore, a performance of the solar cell module is substantially the same as that of a conventional module.

Figure 4:
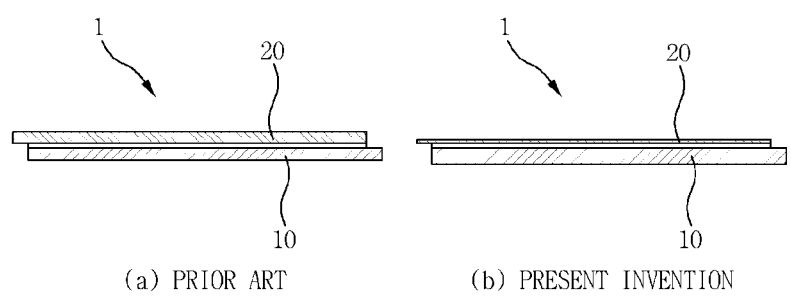
FIG. 4 illustrates pictures for comparing the thicknesses of a conventional solar cell module and a solar cell module according to the exemplary embodiment of the present invention.

FIG. 4 illustrates pictures representing cross-sections of an actually manufactured module, and it can be seen that the module 1 of the present invention using a glass substrate as a substrate material of the counter electrode 20 has a decreased thickness as compared with that of the conventional module.

Additionally, Table 1 represents weights and thicknesses of glass when transparent conductive substrates have different thicknesses, wherein a size (130 mm(w)×100 mm(h)) of glass substrates and thicknesses of transparent electrode material layers are the same in respective transparent conductive substrates.

TABLE 1

| Conductive Substrate | Glass Thickness (mm) | Weight (g) |
|---|---|---|
| (a) | 2.2 | 73.377 |
| (b) | 0.56 | 18.018 |
| (c) | 0.73 | 22.435 |

Table 2 represents weights (two sheets of glass are used, (a) for a working electrode, (b) for a counter electrode) when the transparent conductive substrates of Table 1 are bonded, and shows that weight is reduced by 35 to 37% when a conductive substrate having a different thickness is used.

TABLE 2

| Conductive Substrate | | Glass Thickness (mm) | Weight (g) |
|---|---|---|---|
| 1 | (a) + (a) | 4.40 | 146.754 |
| 2 | (a) + (b) | 2.76 | 91.395 |
| 3 | (a) + (c) | 2.93 | 95.812 |

Hereinafter, a process of manufacturing a solar cell module according to the present invention will be described below, but the present invention is not limited thereto.

First, an FTO transparent conductive substrate for a counter electrode is manufactured by using a thin glass plate substrate with a thickness of 0.56 mm and an FTO transparent conductive substrate for a working electrode is manufactured by using a glass substrate with a thickness of 2.2 mm. Then, an electrolyte injection aperture is formed in the substrate for the counter electrode. The FTO transparent conductive substrates are then washed and dried, and silver collector cells and a bottom portion are stacked on the FTO transparent conductive substrate for the working electrode through screen printing. Silver paste containing silver of 80 to 90 wt % with respect to the 100 wt % of paste, and an amount of silver is 80 wt % and diethylene glycol is added to the paste.

After the collector cells and the bottom portion are printed, the FTO transparent conductive substrate is dried in an oven and a TiO$_2$ photo-electrode is formed to have a thickness of approximately 15 micrometers. Next, after the collector protective film is formed using glass frit through screen printing, a known Ru-based dye is adsorbed in the TiO$_2$ photo-electrode. After the FTO transparent conductive substrate is dried in an oven, it is heat-treated in a sintering furnace at a temperature of 500 degrees Celsius to finish the working electrode.

For the counter electrode, the silver collector cells and the bottom portion are stacked on the FTO transparent conductive substrate through screen printing, in which case an amount of silver of the paste is about 70 to 80 wt % with respect to 100 wt % of the paste or ink consisting of particles, a dispersing agent, and a solvent may be used. In the embodiment of the present invention, 80 wt % of silver paste whose amount of other additives is relatively small is used for the silver paste. In the silver paste, silver nitrate ($AgNO_3$) is used for the silver nano particle precursor and 10 wt % of lauric acid is used for the binder. n-butylamine is used for the solvent and sodium borohydride is used for a reducing agent. Approximately 5% of diethylene glycol is added to disperse the silver nano ink.

After the collector cells and the bottom portion are printed, the FTO transparent conductive substrate is dried in an oven and a platinum precursor solution is manufactured by using isopropanol and $H_2PtCl_6.H_2O$. Then, a platinum catalytic electrode is formed using a spraying process.

After it is dried and heat-treated at a temperature of 400 degrees Celsius in a sintering furnace, the counter electrode is finished by forming a protective film of the collector, and then Surlyn (Dupont) is used for a material for the protective film. Thereafter, e.g., Syrlyin, is used as a sealant to bond the working electrode and the counter electrode at a temperature of 120 degrees Celsius, and an electrolyte (e.g. 0.1 M Lithium iodide, 0.05 M iodine, 0.6 M 1,3-dimethylimidazolium iodide, 0.5 M tert-butyl pyridine/3-Methoxypropionitrile) is manufactured and is injected through the electrolyte injection aperture of the counter electrode.

Generally, when a dye-sensitized solar cell is manufactured, it is boned using heat and pressure with a hot press. However, when substrates with different thicknesses are used as in the present invention, if a hot press is used, glass may be broken. Thus, if it is maintained in an oven of 120 degrees Celsius for 2 to 3 minutes by using a frame which can apply a pressure uniformly only to a peripheral bonding portion, it may be bonded uniformly without being broken.

Thereafter, the module of the present invention in FIG. 4 is finished by blocking the electrolyte injection aperture of the counter electrode with sealing glass. The performance of the manufactured dye-sensitized solar cell module is represented in FIG. 3. The solar cell module is manufactured by applying the same process to the portions other than the counter electrode substrate. When compared with a module using an FTO conductive substrate with a thickness of more than 2 mm as the substrates for the working electrode and the counter electrode, the module of the present invention using an FTO conductive substrate with a thickness of 0.56 mm as a substrate of the counter electrode showed almost no difference in performance.

TABLE 3

|  | Photocurrent ($mA/cm^2$) | Photovoltage (V) | Fill Factor | Efficiency (%) |
|---|---|---|---|---|
| Compared Module | 13.34 | 0.71 | 0.51 | 4.83 |
| Embodiment | 13.60 | 0.73 | 0.48 | 4.70 |

Although an exemplary embodiment of the present invention has been described in detail, the scope of the present invention is not limited thereto but various modifications and improvements made by those skilled in the art using the basic concepts of the present invention defined in the appended claims also pertain to the scope of the present invention.

What is claimed is:

1. A dye-sensitized solar cell module comprising:
a working electrode formed by stacking a collector, a photo-electrode to which a dye is adsorbed, and a transparent electrode material layer on a transparent conductive substrate;
a counter electrode formed by stacking a collector, a catalytic electrode, and a transparent electrode material layer on a transparent conductive substrate; and
an electrolyte filled in a space between the working electrode and the counter electrode sealed by a sealant,
wherein a glass substrate for the counter electrode of glass substrates forming the transparent conductive substrates for the electrodes is a thin glass plate substrate thinner than a glass substrate for the working electrode,
wherein the transparent electrode material layer for the counter electrode is formed between the catalytic electrode and the thing glass plate substrate while being in direct contact with the thin glass plate substrate and the catalytic electrode,
wherein the counter electrode consists essentially of the transparent electrode material layer, the thin glass plate substrate thinner than the glass substrate of the transparent conductive substrate for the working electrode, the catalytic electrode and the collector, and the thin glass plate substrate thinner than the glass substrate of the transparent conductive substrate for the working electrode is not flexible.

2. The dye-sensitized solar cell module of claim 1, wherein a thickness of the glass substrate for the working electrode is 1.5 to 3 mm and a thickness of the glass substrate for the counter electrode is 0.1 to 1 mm.

* * * * *